United States Patent
Kolar et al.

(10) Patent No.: US 11,240,122 B2
(45) Date of Patent: Feb. 1, 2022

(54) EVENT-TRIGGERED MACHINE LEARNING FOR RARE EVENT FORECASTING IN A SOFTWARE DEFINED WIDE AREA NETWORK (SD-WAN)

(71) Applicant: Cisco Technology, Inc., San Jose, CA (US)

(72) Inventors: Vinay Kumar Kolar, San Jose, CA (US); Jean-Philippe Vasseur, Saint Martin D'uriage (FR); Grégory Mermoud, Veyras VS (CH); Pierre-Andre Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 11 days.

(21) Appl. No.: 16/694,520

(22) Filed: Nov. 25, 2019

(65) Prior Publication Data
US 2021/0160148 A1    May 27, 2021

(51) Int. Cl.
*H04L 12/24* (2006.01)
*G06N 20/00* (2019.01)
*H04L 12/28* (2006.01)
*H04L 12/46* (2006.01)

(52) U.S. Cl.
CPC ............ *H04L 41/16* (2013.01); *G06N 20/00* (2019.01); *H04L 12/2854* (2013.01); *H04L 41/20* (2013.01)

(58) Field of Classification Search
CPC ..... H04L 41/16; H04L 12/2854; H04L 41/20; H04L 12/4633; G06N 20/00
See application file for complete search history.

(56) References Cited

U.S. PATENT DOCUMENTS

| | | | |
|---|---|---|---|
| 8,731,994 B2 | 5/2014 | Kass et al. | |
| 9,794,145 B2 | 10/2017 | Vasseur et al. | |
| 2013/0010610 A1* | 1/2013 | Karthikeyan | H04L 41/16 370/242 |
| 2017/0054641 A1* | 2/2017 | Anerousis | H04W 24/08 |
| 2017/0178012 A1 | 6/2017 | Borza et al. | |
| 2019/0044824 A1* | 2/2019 | Yadav | H04W 24/04 |

(Continued)

OTHER PUBLICATIONS

Title: "Learning to Predict Rare Events in Event Sequences" Author: Gary M. Weiss and Haym Hirsh Publisher: AAAI Press (Year: 1998).*

(Continued)

*Primary Examiner* — Ario Etienne
*Assistant Examiner* — Kamal Hossain
(74) *Attorney, Agent, or Firm* — Behmke Innovation Group LLC; Kenneth J. Heywood; Jonathon P. Western

(57) ABSTRACT

In one embodiment, a service detects that an event of a particular event type has occurred in a software-defined wide area network (SD-WAN). The service activates, in response to detecting the occurrence of the event, a machine learning model to assess telemetry data regarding a first tunnel in the SD-WAN. The service predicts a failure of the first tunnel, based on the assessment of the telemetry data regarding the first tunnel by the machine learning model. The service proactively reroutes at least a subset of traffic on the first tunnel onto a second tunnel in the SD-WAN, in advance of the predicted failure of the first tunnel.

20 Claims, 12 Drawing Sheets

(56) References Cited

U.S. PATENT DOCUMENTS

| | | | |
|---|---|---|---|
| 2019/0188584 A1* | 6/2019 | Rao | G06Q 10/00 |
| 2019/0259499 A1* | 8/2019 | Hong | G16H 50/20 |
| 2019/0303726 A1* | 10/2019 | Cote | G06N 20/00 |
| 2019/0361784 A1* | 11/2019 | Savanur | G06F 11/079 |
| 2020/0167634 A1* | 5/2020 | Jain | G06N 7/00 |
| 2020/0204452 A1* | 6/2020 | Bhat | H04L 41/14 |
| 2020/0213199 A1* | 7/2020 | Sethi | H04L 41/0823 |
| 2020/0287819 A1* | 9/2020 | Theogaraj | H04L 45/74 |

OTHER PUBLICATIONS

Gary M Weiss et al., "Learning to Predict Rare Events in Event Sequences", Research Gate, Jan. 1998, 5 pages.

Danie S. Hain et al., "Introduction to Rare-Event Predictive Modeling for Inferential Statisticians—A HandsOn Application in the Prediction of Breakthrough Patents", Druid, Druid19, Copenhagen Business School, Copenhagen, Denmark Jun. 19-21, 2019, 40 pages.

Josh Attenberg et al., "Class Imbalence and Active Learning", Imbalanced Learning: Foundations, Algorithms, and Applications, 2013 John Wiley & Sons, Inc., pp. 101-150.

* cited by examiner

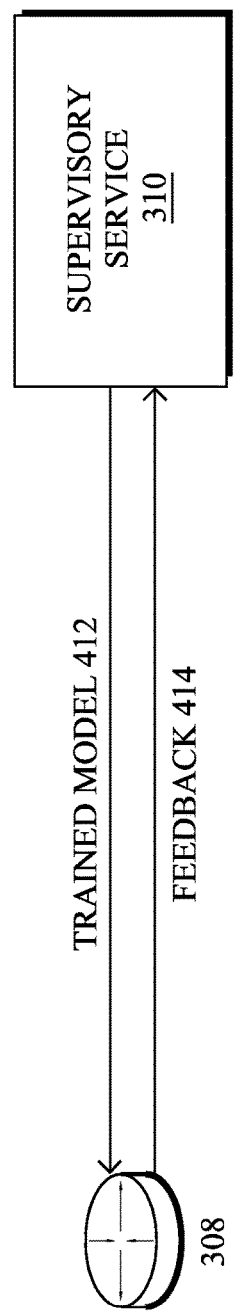

EVENT-TRIGGERED MACHINE LEARNING FOR RARE EVENT FORECASTING IN A SOFTWARE DEFINED WIDE AREA NETWORK (SD-WAN)

TECHNICAL FIELD

The present disclosure relates generally to computer networks, and, more particularly, to event-triggered machine learning for rare event forecasting in a software defined wide area network (SD-WAN).

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection and proactive routing in an SD-WAN now becomes possible through the use of machine learning techniques. However, tunnel failures in SD-WANs are relatively rare events, with potentially thousands of examples of normal behavior for each example of a failure. This imbalance in the available training dataset for the prediction model gives way to the potential for false positives to occur (i.e., the model incorrectly predicts a tunnel failure). These false positives can be quite costly, particularly if the traffic is rerouted onto a backup path/tunnel that does not offer the same performance as that of the original.

BRIEF DESCRIPTION OF THE DRAWINGS

FIGS. 4A-4C illustrate examples of feedback for failure predictions;

DESCRIPTION OF EXAMPLE EMBODIMENTS

Overview

Figure 1A:
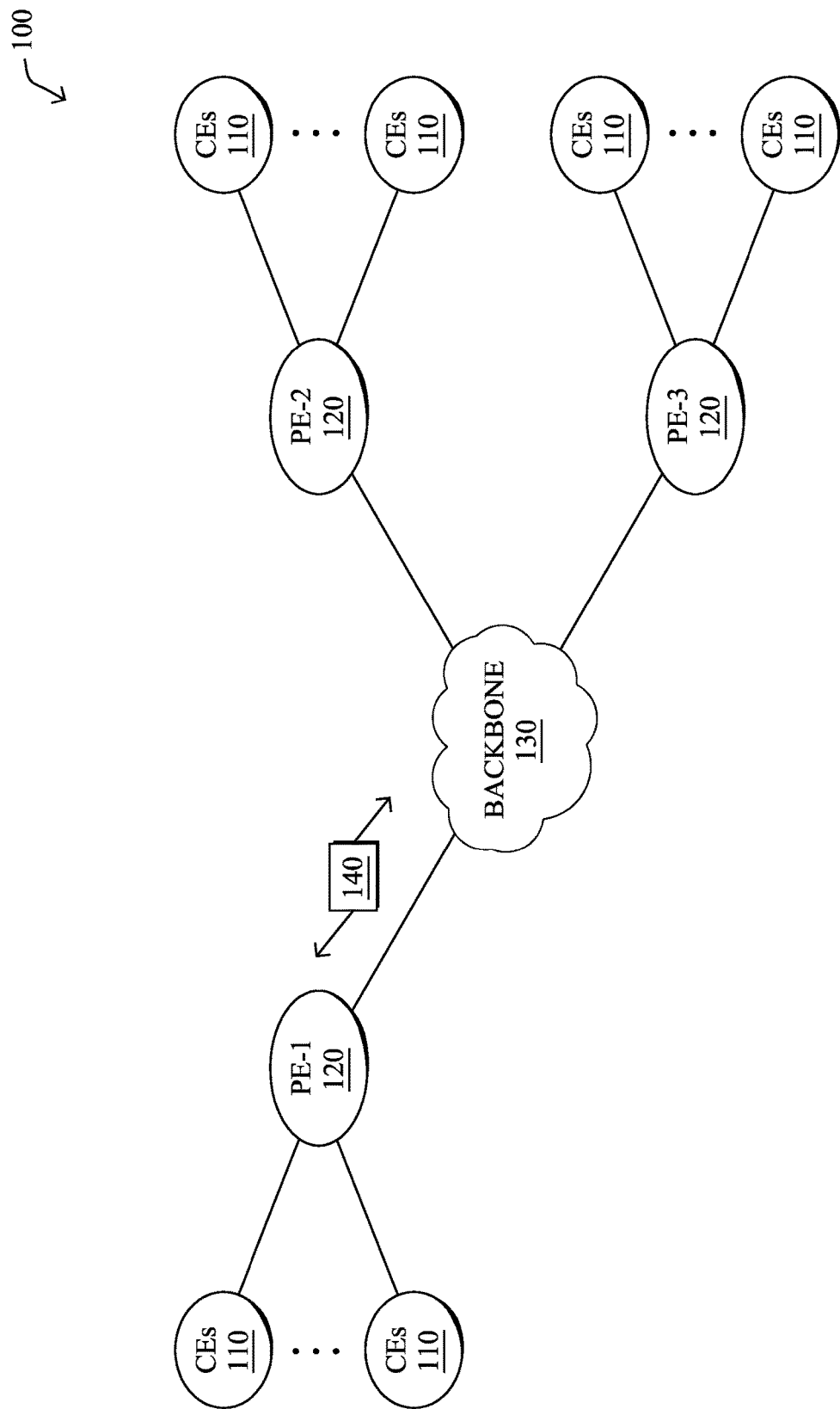
FIGS. 1A-1B illustrate an example computer network.

According to one or more embodiments of the disclosure, a service detects that an event of a particular event type has occurred in a software-defined wide area network (SD-WAN). The service activates, in response to detecting the occurrence of the event, a machine learning model to assess telemetry data regarding a first tunnel in the SD-WAN. The service predicts a failure of the first tunnel, based on the assessment of the telemetry data regarding the first tunnel by the machine learning model. The service proactively reroutes at least a subset of traffic on the first tunnel onto a second tunnel in the SD-WAN, in advance of the predicted failure of the first tunnel.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
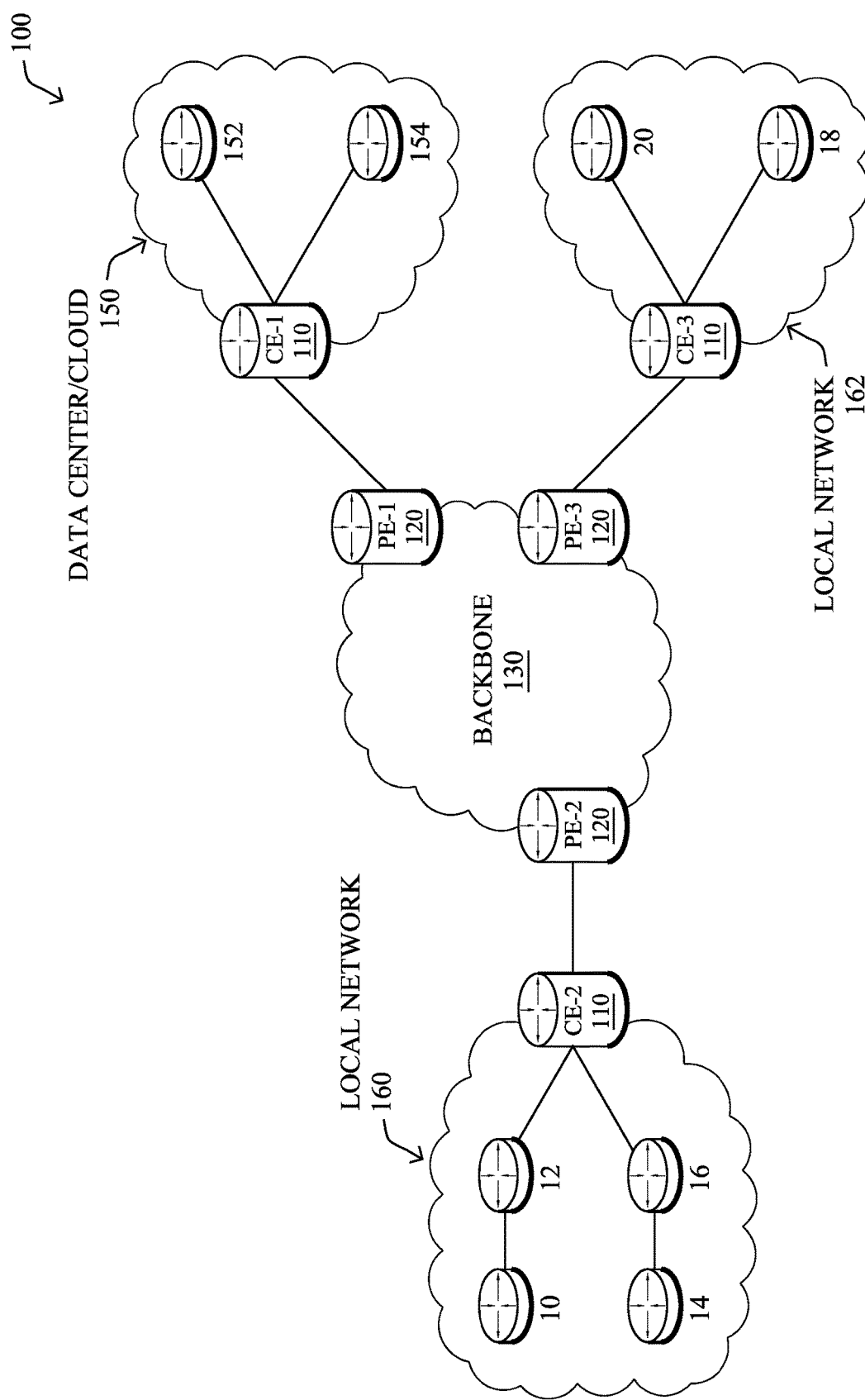

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
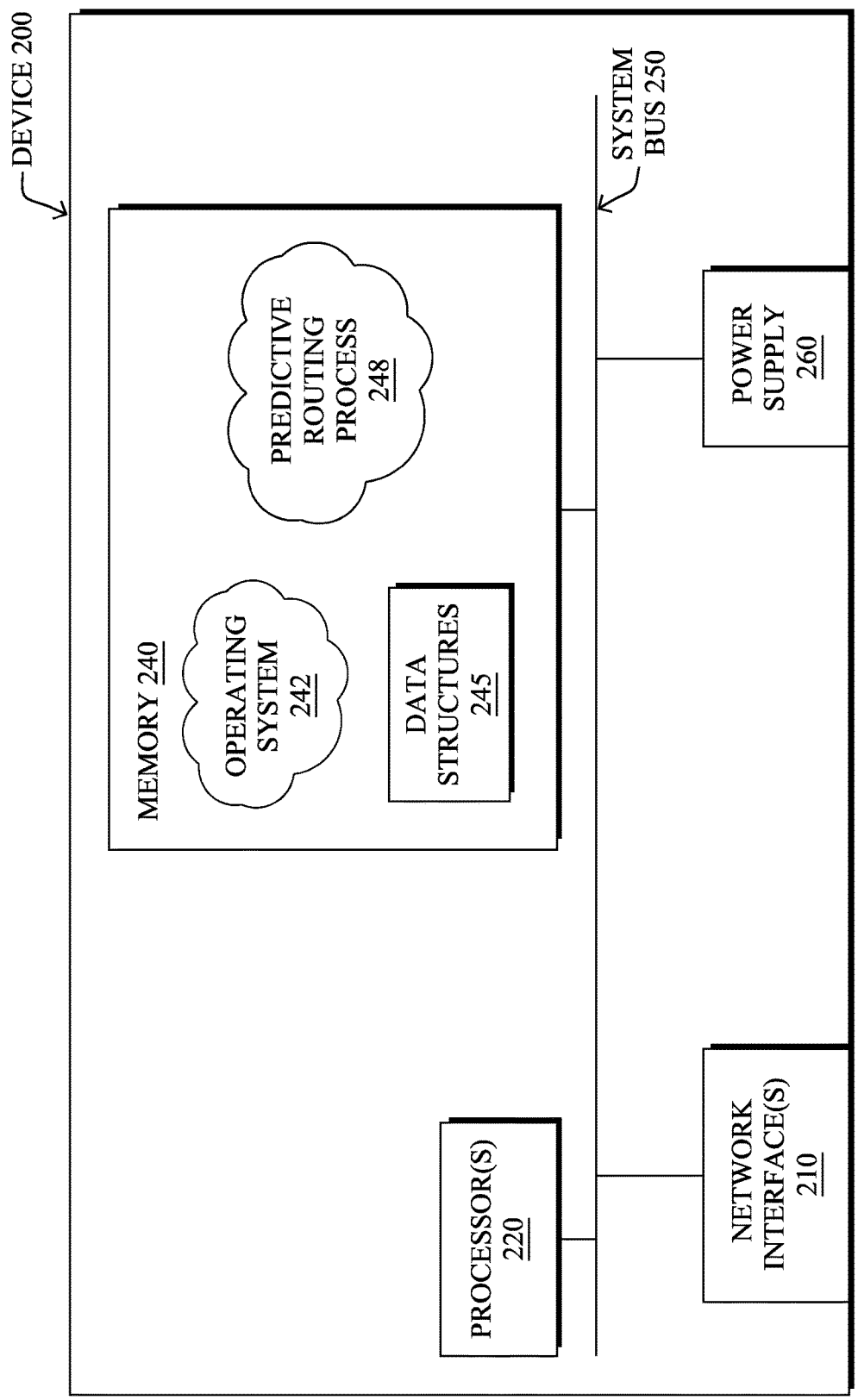
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 248 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, predictive routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may also include computer executable instructions that, when executed by processor(s) 220, cause device 200 to predict failures of network elements in the network (e.g., a link or node/device), thereby allowing device 200 to proactively reroute traffic to avoid the failed element. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a network element failure, such as failure of a link or node/device, or indicative of normal operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a network element will fail. Conversely, the false negatives of the model may refer to the number of times the model predicted normal network element operations, when the network element actually fails. True negatives and positives may refer to the number of times the model correctly predicted whether a network element will perform normally or will fail, respectively. Related to these measurements are the concepts of recall and precision.

Generally, recall refers to the ratio of true positives to the sum of true positives and false negatives, which quantifies the sensitivity of the model. Similarly, precision refers to the ratio of true positives the sum of true and false positives.

As noted above, failure detection in a network has traditionally been reactive, meaning that the failure must first be detected before rerouting the traffic along a secondary (backup) path. This is true, not only for IP and MPLS networks, but also for optical networks (with protection and restoration) such as SONET and SDH networks. Typically, failure detection leverages either explicit signaling from the lower network layers (e.g., optical failures signaled to the upper layers) or using a keep-alive mechanism that sends probes at some interval T that must be acknowledged by a receiver (e.g., a tunnel tail-end router). For example, routing protocols such as Open Shortest Path First (OSPF) and Intermediate System to Intermediate System (ISIS) use keep-alive signals over routing adjacencies or MPLS traffic engineering (TE) tunnels. Protocols such as Bidirectional Forwarding Detection (BFD) also make use of keep-alive mechanisms.

Traditionally, failure detection in an SD-WAN has relied on the keep-alive mechanisms of BFD over tunnels, such as IPSec tunnels. When the BFD signaling times out, the tunnel is flagged as failed and traffic is rerouted onto another tunnel. While this approach does help to mitigate the effects of the failure, the reactive nature of this approach also means that at least some of the traffic will be lost.

Figure 3:
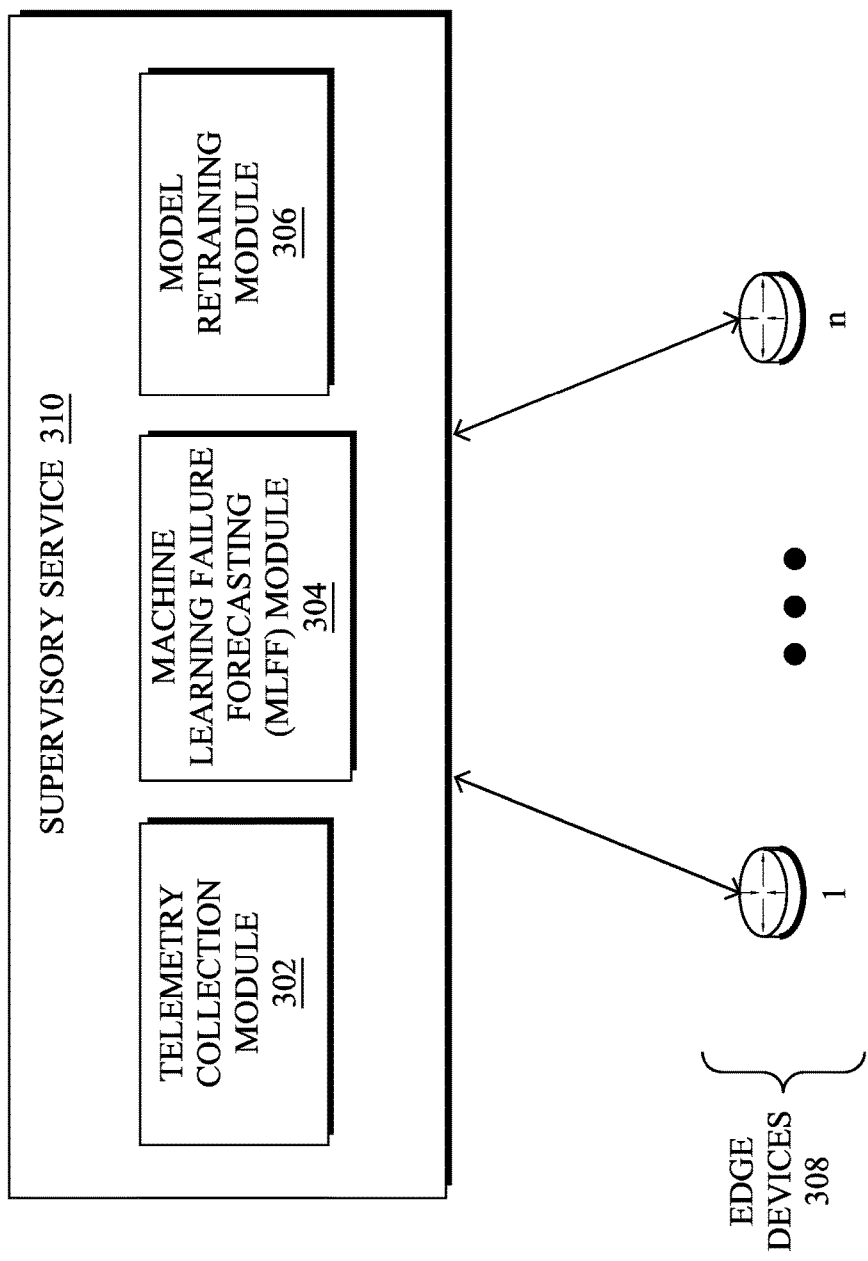
FIG. 3 illustrates an example architecture for predicting failures in a network.

FIG. 3 illustrates an example architecture 300 for predicting failures in network, according to various embodiments. In general, architecture 300 may include a supervisory service 310 located in the cloud or implemented locally in the network under scrutiny, such as a supervisory service for an SD-WAN. As shown, supervisory service 310 may include the following components: a telemetry collection module 302, a machine learning failure forecasting (MLFF) module 304, and/or a model retraining module 306. These components 302-306 may be implemented in a distributed manner or implemented as their own stand-alone services, either as part of the network under observation or as a remote service. In addition, the functionalities of the components of architecture 300 may be combined, omitted, or implemented as part of other processes, as desired.

Supervisory service 310 may be in communication with any number of devices 308 (e.g., a first through n$^{th}$ device), which may be CE routers 110 and/or PE routers 120, described previously, or other forms of networking devices configured to convey traffic through the network. In various embodiments, devices 308 may be part of the same SD-WAN or, in cases in which supervisory service 310 is implemented as a cloud-based service, part of any number of different SD-WANs or other networks.

In general, there are many circumstances in a network that can lead to failures in various areas of the network between a head-end and tail-end router (e.g., between routers 110, etc.). An objective of MLFF 304, as detailed below, is to learn early signs (networking behavioral) that have some predictive power, allowing the model to predict/forecast a tunnel failure or a failure of a network element supporting the tunnel. It is expected that some failures are predictable (i.e., there exist early signs of an upcoming failure) while others will not be non predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the device 308 involved and may be localized to the core of the service provider network (e.g., the underlying IP, 4G, 5G, etc. network), in which case the failure is non-predicable from the perspective of the device 308.

A first aspect of architecture 300 relates to telemetry collection module 302 obtaining the telemetry data required for model training by MLFF module 304. As used herein, the term 'relevant telemetry' refers to a telemetry measurement variable with predictive power to predict failures, which can be determined dynamically by MLFF module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from devices 308, supervisory service 310 may send a custom request to one or more of devices 308 with the objective of obtaining the list of events of interest along with the set of candidate telemetry variables with potential predictive power to predict failures. In further embodiments, devices 308 may instead provide the telemetry data to supervisory service 310 on a push basis (e.g., without service 310 first requesting the telemetry data).

In various embodiments, telemetry collection module 302 may adjust the set of telemetry variables/parameters obtained from the device(s) 308 and/or their sampling frequency. If, for example, MLFF module 304 determines that a particular telemetry variable has a strong predictive power (according to the feature importance, Shapley values, etc.), the frequency at which such a variable may be gathered may be higher compared to a variable with lower predictive power. MLFF module 304 may also determine the predictive power of a particular telemetry variable by assessing the conditional probabilities involved, in further embodiments.

MLFF module 304 may also select the set of most relevant telemetry variables. In turn, telemetry collection module 302 may request that devices 308 measure and send these variables to supervisory service 310 periodically, since real-time variations of such telemetry is needed for forecasting failure events. For example, based on the above conclusion, MLFF module 304 may determine that the CPU and memory utilizations of one or more networking devices that support a given tunnel should be sent periodically (e.g., every 1 second) by devices 308.

Other telemetry variables, such as during a rekey failure when a device 308 is not able to successfully exchange the security keys with the controller, may also be requested to be sent to supervisory service 310, on occurrence of the event. Since such events are rare and the states of the variables remain the same for longer periods of time, telemetry collection module 302 may request an event-based push request, rather than periodic messages. In other words, telemetry collection module 302 may instruct one or more of devices 308 to report certain telemetry variables only after occurrence of certain events. For example, Table 1 below shows some example telemetry variables and when a device 308 may report them to supervisory service 310:

TABLE 1

| Relevant Telemetry | Request Type |
| --- | --- |
| Memory_utilization<br>CPU Utilization | Requested from head and<br>tail edge routers. |
| BFD Probe Latency, Loss and Jitter<br>Queue statistics (%-age drops<br>for different queues) | Periodically once every 1 second. |

TABLE 1-continued

| Relevant Telemetry | Request Type |
| --- | --- |
| Interface down event<br>Rekey exchange failure<br>Router crash logs | Requested from both head and<br>tail edge routers<br>Upon event occurrence. |

In a further embodiment, MLFF module 304 may also attempt to optimize the load imposed on the device(s) 308 reporting the telemetry variables to supervisory service 310. For example, MLFF module 304 may determine that the CPU and memory usages should be measured and reported every minute to supervisory service 310.

A key functionality of MLFF module 304 is to train any number of machine learning-based models to predict network element failures. Preferably, the models are timeseries models trained centrally (e.g., in the cloud) using the telemetry collected by telemetry collection module 302. In one instantiation of MLFF module 304, the models may be trained on a per network instance or per-SD-WAN basis. Testing has shown that model performance may be influenced by parameters specific to a given network instantiation, thus promoting an implementation whereby MLFF module 304 trains a model for a specific network deployment. In further embodiments, MLFF module 304 may even train certain models on a per-tunnel basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall >0 is a significant gain. One performance metric that MIFF module 304 may consider is the maximum recall (Max_Recall) achieved by the model given a precision>P_Min. For example, MLFF module 304 may evaluate the variability of Max_Recall across datasets, should a single model be trained across all datasets, to determine whether an SD-WAN specific or even a tunnel specific model should be trained.

In various embodiments, MLFF module 304 may dynamically switch between per-tunnel, per-network/SD-WAN, and global (multiple SD-WAN) approaches to model training. For example, MLFF module 304 may start with the least granular approach (e.g., a global model across all networks/SD-WANs) and then evaluate the performance of the global model versus that of per-customer/SD-WAN models. Such model performance comparison could be easily evaluated by comparing their related precision-recall curves (PRCs)/area under the curve (AUCs), or the relative Max_Recall, given that Precision>P_min.

In some cases, MLFF module 304 may employ a policy to trigger per-customer/SD-WAN specific model training, if the Max_Recall value improvement is greater than a given threshold. In another embodiment, a similar policy approach may be used to specifically require a dedicated model for a given tunnel according to its characteristic (between router A and router B), the type of traffic being carried out (e.g., sensitive traffic of type T, etc.), or the performance of the global or SD-WAN specific model for that tunnel. In such a case, the devices 308 may be in charge of observing the routed traffic and, on detecting a traffic type matching the policy, request specific model training by MLFF module 304, to start per-tunnel model training for that tunnel.

Prototyping of the techniques herein using simple models and input features based on coarse telemetry, such as 1-minute averages of loss, latency, jitter, traffic, as well as CPU/memory of CE routers, lead to recalls in the range of a few percent with a precision of 80% or more. More advanced timeseries models, such as long short-term memories (LSTMs), especially with attention mechanisms, will achieve even better performance. More importantly, using richer and more fine-grained telemetry is an important driver of the forecasting performance.

Once MLFF module 304 has trained a prediction model, different options exist for its inference location (e.g., where the model is executed to predict failures). In a first embodiment, model inference is performed centrally (in the cloud), thus co-located with the model training. In such a case, once MLFF module 304 identifies the set of telemetry variables with predictive power (used for prediction), telemetry collection module 302 may send a custom message to the corresponding device(s) 308 listing the set of variables along with their sampling/reporting frequencies. Note that sampling is a dynamic parameter used by MLFF module 304 computed so as to optimize the PRC of the model against the additional overhead of the device 308 pushing additional data to the cloud (and also generating additional logging of data on the router).

In another embodiment, MLFF module 304 may push the inference task, and the corresponding prediction model, to a specific device 308, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/device 308 are sufficient to feed the local model.

Thus, in some cases, the techniques herein support centralized model training (e.g., in the cloud), combined with the ability to perform local (on-premise) inference based on the required sampling frequency, local resources available on the device 308, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 304 may take this constraint into account by evaluating the volume of required telemetry, according to the sampling frequency, and the WAN bandwidth allocated on the network for the telemetry traffic. To that end, MLFF module 304 may analyze the topology of the network and the available bandwidth for telemetry reporting, e.g., according to the quality of service (QoS) policy. If the bandwidth available for the telemetry used for the inference of the model exceeds the capacity, MLFF module 304 may decide to activate a local inference by pushing a prediction model to one or more of devices 308.

In yet another embodiment, MLFF module 304 may take a mixed approach whereby some of devices 308 perform the inferences locally, while others rely on supervisory service 310 to perform the predictions.

A further embodiment of the techniques herein introduces a feedback mechanism whereby feedback regarding the predictions by a trained model is provided to model retraining module 306. In cases in which the model is executed on device 308, the device 308 may report the rate of false positives and/or false negatives to model retraining module 308. Optionally, the reporting can also include additional context information about each false positive and/or false negative, such as the values of the telemetry variables that led to the incorrect prediction. If the performance of the model is below a designated threshold, model retraining module 306 may trigger MLFF module 304 to retrain the model, potentially increasing the granularity of the model, as well (e.g., by training a tunnel-specific model, etc.). In cases in which MLFF module 304 trains multiple prediction models, model retraining module 306 may evaluate the performance of each model and, based on their performances, decide that a particular one of the models should be used. Such an approach allows MLFF module 304 to dynamically switch between models, based on the data pattern currently being observed.

When failures are predicted in the cloud by supervisory service 310, model retraining module 306 may similarly receive feedback from devices 308 regarding the predictions. For example, once a model M predicts the failure of a tunnel at a given time, MLFF module 304 may send a notification to the affected device 308 indicating the (list of) tunnel(s) for which a failure is predicted, along with the predicted time for the failure, and other parameters such as the failure probability $P_f$ (which can be a simple flag, a categorical variable (low, medium, high) or a real number). The device 308 may use $P_f$ to determine the appropriate action, such as pro-actively rerouting the traffic that would be affected by the failure onto a backup tunnel. In one embodiment, the predicted failure may be signaled to the device 308 using a unicast message for one or more tunnels, or a multicast messages signaling a list of predicted failure to a set of devices 308.

Regardless of how model retraining module 306 receives its feedback, either from the device 308 executing the prediction model or from MLFF module 304 executing the model, model retraining module 306 may dynamically trigger MLFF module 304 to retrain a given model. In one embodiment, the model re-training may be systematic. In another embodiment, upon reaching a plateau in terms of improvement for Max_Recall or Max Precision, model retraining module 306 may reduce the frequency of the model training.

Figure 4A:
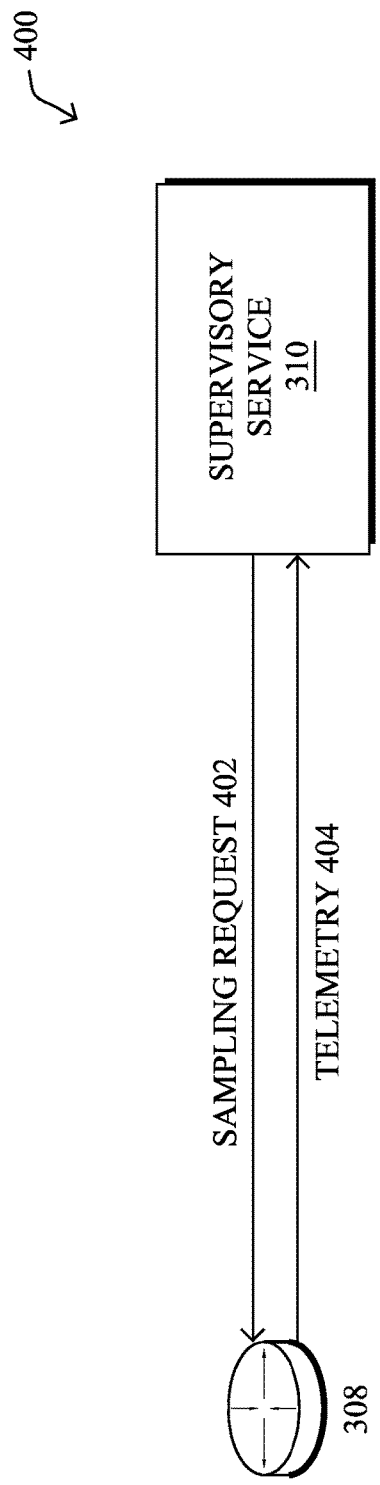
Figure 4B:
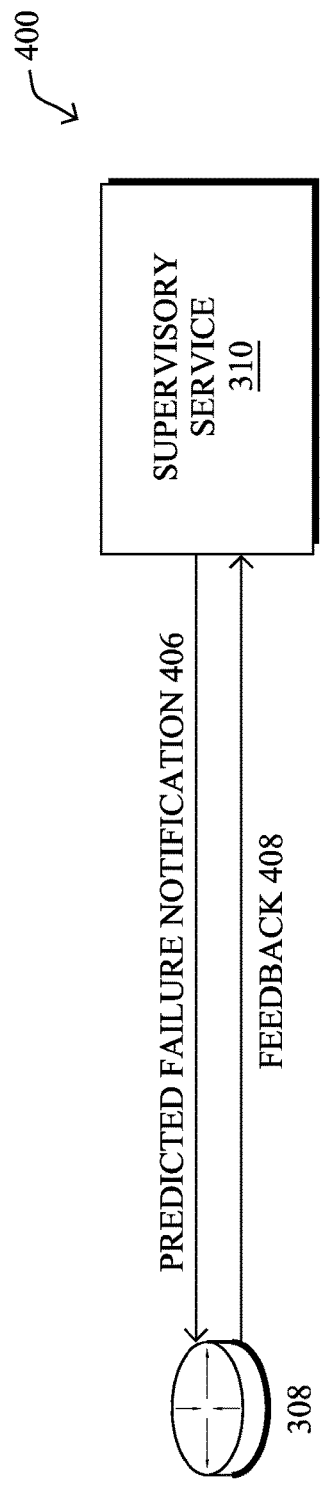

FIGS. 4A-4C illustrate examples of feedback for failure predictions, in various embodiments. As shown in example implementation 400 in FIGS. 4A-4B, assume that the trained model is executed in the cloud by supervisory service. In such a case, supervisory service 310 may send a sampling request 402 to a device 308 that indicates the telemetry variables to sample and report, as well as the determined sampling/reporting period(s) for those variables. In turn, device 308 may report the requested telemetry 404 to supervisory service 310 for analysis. For example, supervisory service 310 may request that device 308 report is CPU load every minute to supervisory service 310, to predict whether the tunnel associated with device 308 is predicted to fail. More specifically, supervisory service 310 may use telemetry 404 as input to its trained prediction model, to determine whether telemetry 404 is indicative of a failure that will occur in the future.

When supervisory service 310 determines that a failure of a network element is predicted, it may send a predicted failure notification 406 to device 308 that identifies the element predicted to fail, the time at which the failure is expected to occur, and potentially the probability of failure, as well. Depending on the timing and probability of failure, device 308 may opt to reroute the affected traffic, or a portion thereof. In turn, device 308 may monitor the element predicted to fail and provide feedback 408 to supervisory service 310 indicating whether the element actually failed and, if so, when. Supervisory service 310 can then use feedback 408 to determine whether model retraining should be initiated, such as by training a more granular model for the SD-WAN instance or the specific tunnel or path under scrutiny.

FIG. 4C illustrates an alternate implementation 410 in which supervisory service 310 pushes the failure prediction model to device 308 for local/on-premise inference. For example, supervisory service 310 may opt for device 308 to perform the local inferences, such as when model 412 requires too much bandwidth to send the needed telemetry to supervisory service 310 for cloud-based prediction. In turn, device 308 may use the corresponding telemetry measurements as input to trained model 412 and, if a failure is predicted, perform a corrective measure such as proactively rerouting the traffic to one or more other tunnels or other paths. In addition, device 308 may provide feedback 414 to supervisory service 310 that indicates false positives and/or false negatives by the model. For example, if device 308 reroutes traffic away from a element predicted by model 412 to fail, and the tunnel does not actually fail, device 308 may inform supervisory service 310. Supervisory service 310 may use feedback 414 to determine whether model 412 requires retraining, such as by adjusting which telemetry variables are used as input to the model, adjusting the granularity of the training (e.g., by using only training telemetry data from the tunnel, etc.), or the like.

As noted above, machine learning now makes predictive routing possible in SD-WANs and other networks by predicting path or tunnel failures before they actually occur. However, the forecasting of extreme events, i.e., those that occur very rarely, is still quite challenging due to the great imbalance in the dataset used for training and testing the predictive models. This imbalance is due to the fact that there are many more negative examples (e.g., from normal operation) than positive examples (e.g., from the extreme events). Notably, in SD-WANs, for every example of a rare event, there are thousands of normal samples that must be analyzed.

The key problem with imbalanced datasets is that even a small classification error can lead to very poor Precision-Recall Curves (PRCs). Indeed, given an imbalance of 1:1000, a classification error of 1% (i.e., a model with 99% accuracy) will lead to 10 false positives for every true positive, thus leading to only 10% precision. Testing has shown that SD-WAN tunnel failures occur roughly every 3.5 days on average, thus leading to an imbalance of 1:5000 for datasets sampled at one minute. As a result, to achieve 95% precision, a classifier must be trained that has at least 99.999% accuracy. Indeed, given 200 positives and 1,000,000 negatives (1:5000 ratio), an error rate of 0.001% will lead to 10 false positives and 200 true positives. Even with such incredible accuracy, the system will still generate about 7,200 false alarms per day for the deployment of 500,000 tunnels, out of 720 million total samples.

Event-Triggered Machine Learning for Rare Event Forecasting in an SD-WAN

The techniques herein allow for the prediction of tunnel failures in a network, such as an SD-WAN, while also taking into account rare events in the network. In some aspects, the techniques herein allow for the detection of events that are correlated with failures. In further aspects, the techniques herein leverage machine learning that has been specifically tuned to detect rare events, to predict failures and proactively reroute traffic in the network.

Specifically, according to one or more embodiments herein, a service detects that an event of a particular event type has occurred in a software-defined wide area network (SD-WAN). The service activates, in response to detecting the occurrence of the event, a machine learning model to assess telemetry data regarding a first tunnel in the SD-WAN. The service predicts a failure of the first tunnel, based on the assessment of the telemetry data regarding the first tunnel by the machine learning model. The service proactively reroutes at least a subset of traffic on the first tunnel onto a second tunnel in the SD-WAN, in advance of the predicted failure of the first tunnel.

Illustratively, the techniques described herein may be performed by hardware, software, and/or firmware, such as in accordance with the predictive routing process 248, which may include computer executable instructions executed by the processor 220 (or independent processor of interfaces 210) to perform functions relating to the techniques described herein.

Operationally, the core idea behind predictive routing relates to predicting/forecasting the failure of a link, node, tunnel, etc., so as to proactively reroute traffic onto a secondary/alternate/backup path. As noted above, this can be achieved by training a machine learning model to predict the failures, with the goal of the model training to maximize the recall of the model given a precision that meets or exceeds P_min, with P_min being close to 1.0. Indeed, a false positive of the model means that the predicted failure does not actually occur. Similarly, a false negative of the model means that the model failed to predict an actual failure. In general, false negatives are less problematic, as existing reactive routing mechanisms can still be used to reroute the traffic after the failure is detected. On the other hand, false positives can be quite problematic, since traffic may be rerouted onto secondary paths offering a lower SLA for the traffic, even though the primary tunnel did not fail. This is why high precision is desirable for failure prediction modeling, especially in the case of very unbalanced datasets.

Figure 5:
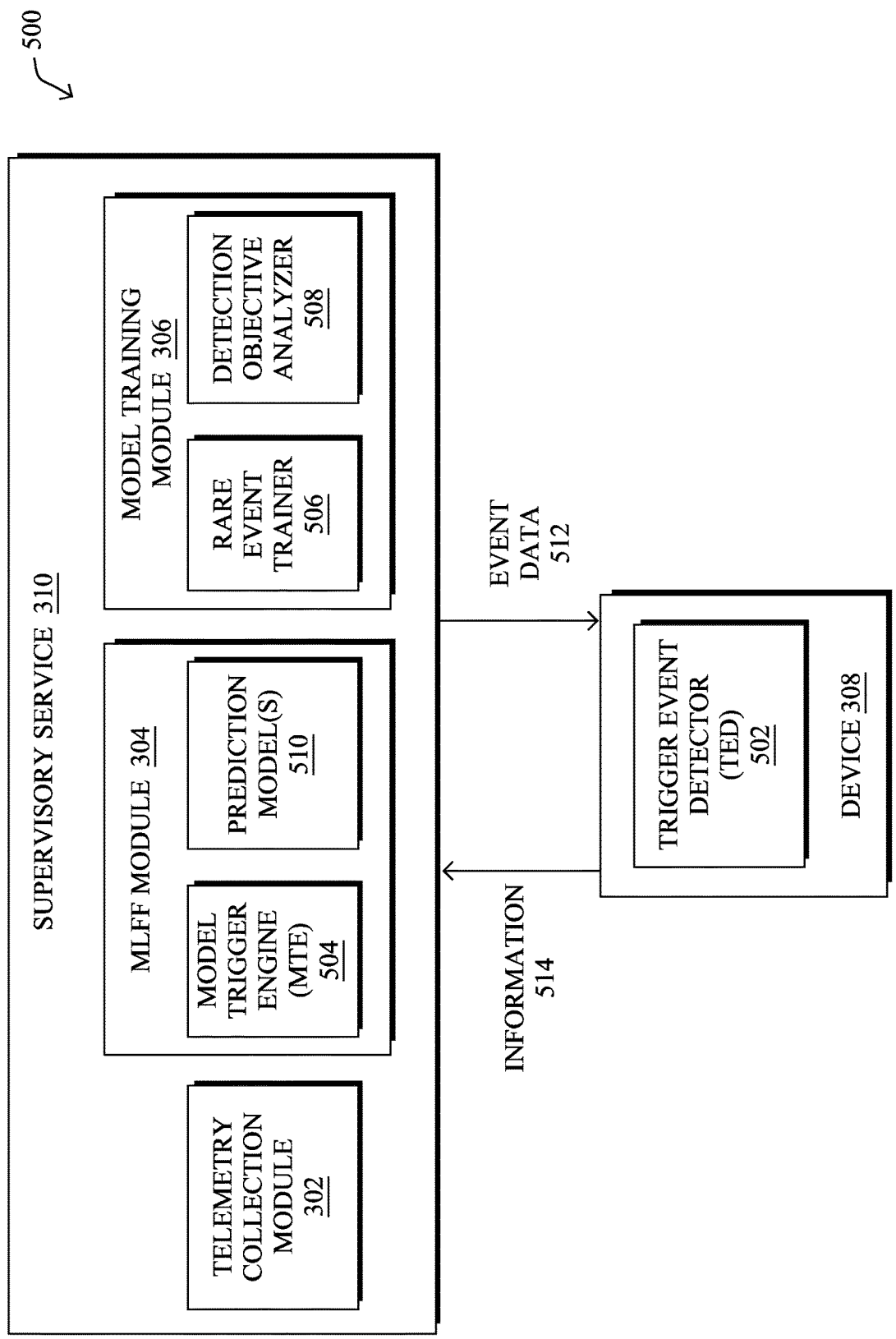
FIG. 5 illustrates an example architecture for the event-triggered prediction of failures in a network.

FIG. 5 illustrates an example architecture 500 for the event-triggered prediction of failures in a network, according to various embodiments. Continuing the example of FIG. 3, architecture 500 may include any or all of the components of architecture 300 with the following additions, to provide a service to the network: a trigger event detector (TED) 502, a model trigger engine (MTE) 504, a rare event trainer 506, a detection objective analyzer 508, and/or prediction model(s) 510. As would be appreciated, the various components shown may be combined or omitted, as desired. Further, these components can be executed either locally on a particular device or implemented in a distributed manner, in various cases. In the distributed case, the set of executing devices can also be viewed as a single device, for purposes of implementing architecture 500.

As would be appreciated, one form of "rare event" that architecture 500 may forecast is an actual failure in the network, such as a failure of an SD-WAN tunnel between two edge routers (e.g., head and tail edge routers). Other forms of rare events that architecture 500 may detect can also include radio failures (e.g., in a wireless network), link flaps (e.g., a link alternating between up and down states), route processor failures, and the like.

To predict a rare event in a network, the problem can be formulated as a binary classification problem where the output is to predict whether the rare event will occur in timestep (t+n), given a set of telemetry data features until time t. In a simple case, n=1 and the prediction may be made for the next timestep. For example, if each timestep is one minute, the prediction may be whether the rare event will occur within the next minute. In general, the telemetry data used to make the prediction can be divided into three classes:

Static attributes: These do not vary across time. Examples of static attributes may include the device model of head and tail edge routers, the countries of origin and destination, and the like.

Synchronous timeseries: These features are sampled at each timestep t such as CPU/memory usage, networking metrics such as loss and latency. Additional features aggregating instantaneous metrics over time windows can also be included in the analysis, in further embodiments.

Asynchronous events: These are the events that occur at any time exhibited by devices in the network such as edge routers or controllers and may have some predictive power (e.g., information to forecast failures) with respect to the type of rare event being predicted. On top of their occurrences, each asynchronous event may carry some quantitative information that might be useful for purposes of forecasting a rare event. For example, a control connection state change event might provide values about the previous and current state ("up" or "down") and the "reason" for change, such as a deleted interface. In addition, architecture 500 may also construct timeseries of telemetry data features based on the occurrences of such events. For example, the number of control connection state changes and the number of "interface deleted" reasons that are observed at time t can be features, in one embodiment.

Traditionally, failure forecasting in a network is achieved by modeling timeseries data, to predict whether a failure will occur or not at every timestep t. However, as noted, such a model will have a very high imbalance ratio since a failure does not typically occur in any given timestep, since failures are rare events. Approaches such as sub-sampling positives and negatives, e.g., down-sampling negatives, up-sampling positives, applying the Synthetic Minority Over-Sampling Technique (SMOTE), or the like, will also typically not help. This is because the model still has to make predictions for each timestep. For example, down-sampling few negatives from this large set of negatives will also leave out the interesting examples, which may turn out as false positives, with a high probability.

In various embodiments, architecture 500 may include model trigger engine (MTE) 504 that is responsible for activating the forecasting/prediction model(s) 510 of MLFF module 304 only when a trigger event is observed. Note that MTE 504 operates only for purposes of model inference and not for training. Also note that the prediction model(s) 510 may be executed as part of supervisory service 310 or, alternatively, in the network undergoing monitoring, such as part of trigger event detector (TED) 502. During execution, MTE 504 may receive indications of detected trigger events from TED 502, which is described in greater detail below, and constructs a dynamic system that predicts only when the trigger events arrive. In one embodiment, MTE 504 may receive the telemetry timeseries features for every timestep from the networking device(s), such as device 308, and/or from an already configured message passing server. Static features may be sent to MTE 504 only once or when they change. In turn, based on the detected trigger event(s) MTE 504 will call the model 510 of MLFF module 304 to predict whether a failure or other rare event is going to occur in the network.

More specifically, in some embodiments, the functionality of MTE 504 may proceed as follows:

1. During each timestep, MTE 504 may count down a timer, such as by decrementing the timer by 1 for each timestep. The timer may initially start at n+1 timesteps.
2. If the timer times out (e.g., reaches 0), MTE 504 may deactivate the model 510, such that no more model inference/prediction will take place, and clear the feature cache of MLFF module 304 (e.g., a cache of the past m-number of timesteps of telemetry feature data timeseries).
3. When a trigger event is detected, MTE 504 may populate the feature cache for m-number of timesteps, including the timeseries features constructed from events and/or static features. For example, MTE 504 may build the set of features (e.g., timeseries) at the end of every timestep. Then, MTE 504 activates/calls the prebuilt model 510 of MLFF module 304 to forecast the rare event (e.g., failure) based on the cached data.

In another embodiment, MTE 504 may fetch the time-series features for the last m-number of timesteps only when the model 510 is active and filled into the cache. Note that further implementations of MTE 504 are also possible, so long as they support the primary function of MTE 504: dynamically activating/calling the predictive model of MLFF module 304 based on the detection of trigger events in the network.

Another potential component of architecture 500 is trigger event detector (TED) 502 which is responsible for detecting the trigger events that provide a strong signal that a failure or other rare event may occur in the network, in various embodiments. In one embodiment, as shown, TED 502 may be hosted at the networking device level, such as on device 308. In further embodiments, TED 502 can also be executed as part of supervisory service 310 or by an intermediary device or service located between device 308 and supervisory service 310.

During operation, TED 502 may base its decisions on a conditional failure probability of an event, given that a failure occurs in the next n-number of timesteps (e.g., in the next five minutes, etc.). Formally, this conditional failure probability (CFP) is as follows:

$$CFP = \frac{\text{number of events of type } E \; n \text{ timesteps before failure}}{\text{total number of events } E}$$

Figure 6:
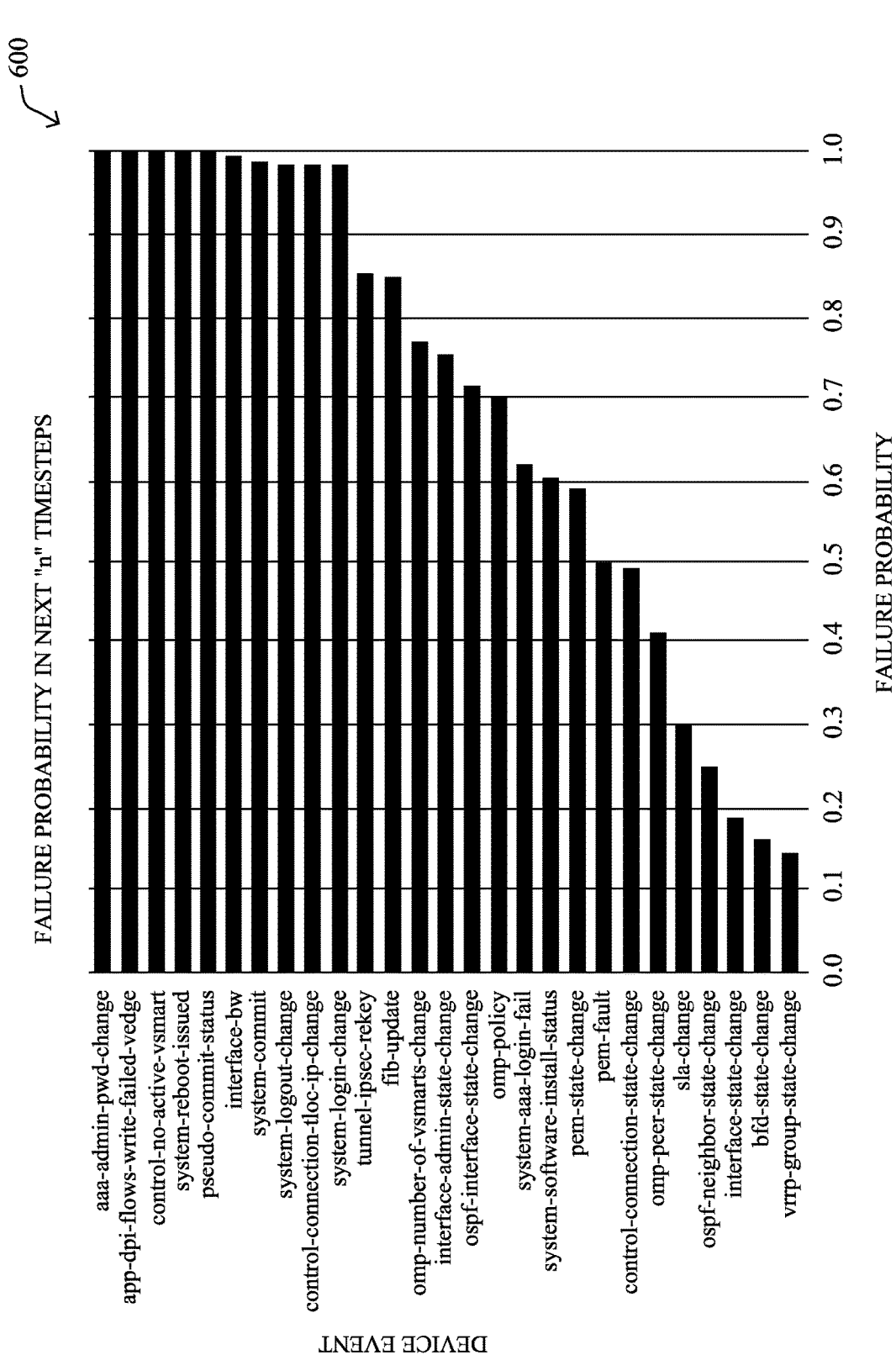
FIG. 6 illustrates an example plot of failure probabilities for different event types.

FIG. 6 illustrates an example plot 600 of the failure probabilities for different event types, based on preliminary testing of the techniques herein. The n-number of timesteps in plot 600 represent a total timespan of five minutes. In other words, plot 600 demonstrates the probability of a failure occurring within five minutes of a triggering event occurring in the network. Such events may generally relate to a configuration or state change in the network. As shown, these triggering events may include, but are not limited to, any or all of the following:

aaa-admin-pwd-change
app-dpi-flows-write-failed-vedge
control-no-active-vsmart
system-reboot-issued
pseudo-commit-status
interface-bw
system-logout-change
control-connection-tloc-ip-change
system-login-change
tunnel-ipsec-rekey
fib-update
omp-number-of-vsmart-change
interface-admin-state-change
ospf-interface-state-change
omp-policy
system-aaa-login-fail
system-software-install-status
pem-state-change
pem-fault
control-connection-state-change
omp-peer-state-change
sla-change
ospf-neighbor-state-change
interface-state-change
bfd-state-change
vrrp-group-state-change
etc.

TED 502 can identify such events, for example, using SNMP traps or other monitoring functions within the network. From plot 600, it can be seen that certain events are more closely associated with failures than others. For example, the topmost events shown in plot 600 will almost always be seen with a corresponding failure within a five-minute window. Accordingly, TED 502 may assess whether any of the top x-number of trigger events have occurred in the network during a given timestep.

It is important to note that relying on a single metric, such as the failure provability of an event, may not detect all failures. For example, while the 'system-reboot-issued' event always led to a failure, such events happen rarely and relying only on them will miss the prediction of many failures. For this reason, in further embodiments, TED 502 may also base its decisions on an event coverage fraction (ECF), which is defined as follows:

$$ECF = \frac{\text{number of events of type } E \; n \text{ timesteps before failure}}{\text{total number of all events observed } n \text{ timeseps before failure}}$$

Figure 7:
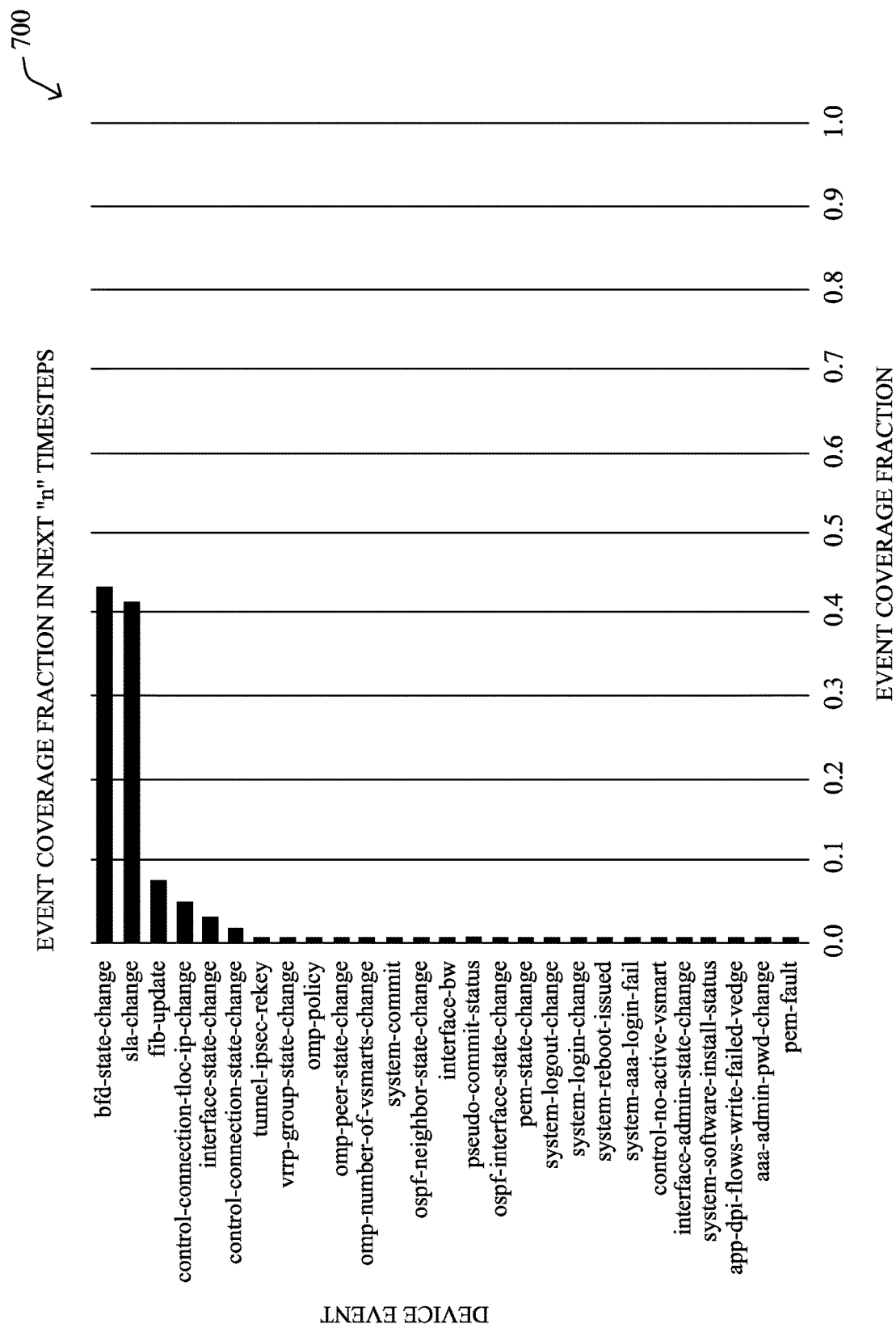
FIG. 7 illustrates an example plot of coverage fractions for different event types.

The ECF metric thus represents how often the event type was seen prior to a failure among all of the event types. FIG. 7 illustrates an example plot 700 of the ECFs for the events shown previously in FIG. 6, based on preliminary testing of the techniques herein. As shown, for example, the ECF is around 0.42 for a "bfd-state-change" event indicating that 42% of the events observed in the five minute time window before failure were of this type. Accordingly, to determine the trigger events for failure, TED 502 may compute a set-intersection of the top-k failures by CFP and/or ECF.

A further metric that TED 502 may also take into account is the total coverage fraction (TCF), which is defined as follows $$TCF = \frac{\text{total number of failures when any of the trigger events occur}}{\text{total number of actual failures}}$$

Figure 8A:
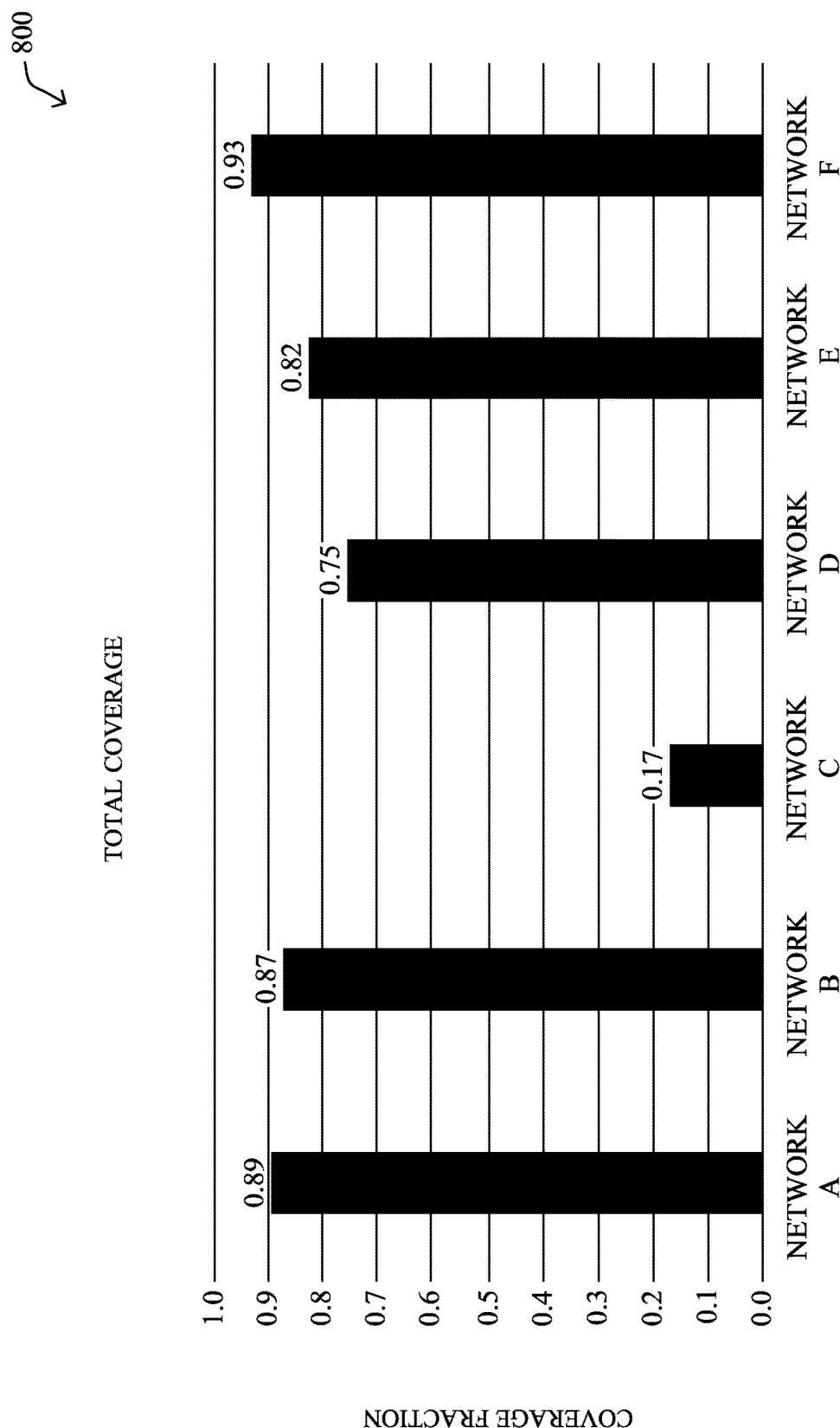
FIGS. 8A-8B illustrate example plots of test results for the techniques herein.

For example, if the total coverage fraction is 0.7, then it means that, at maximum, 70% of the failures can be detected if the trigger events are used by MTE 504 to activate the model inference by model 510 of MLFF 304. FIG. 8A illustrates a plot 800 of the TCF values derived during preliminary testing for six different networks. A can be seen from plot 800, selecting the appropriate set of trigger event/event types leads to a coverage of 75%-93%.

Other metrics may also be used to compute trigger events and the set of trigger events that TED 502 seeks to detect may also be changed over time. For example, TED 502 may receive a current list of trigger events as part of event data 512 from supervisory service 310 that can be dynamically adjusted (e.g., based on the performance of MLFF module 304, etc.). In turn, TED 502 may be executed periodically to dynamically detect the trigger events in the network.

In yet another embodiment, TED 502 may look for a combination of events to signal MTE 504. For example, TED 502 may look for a number of events of type E1 & E1, or E1 or E2 "n" timesteps before failure/total number of all events observed "n" timesteps before failure, or any of the above combinations. Note that using a DET-based approach allows for increasing the precision, but at the expense of the recall.

Continuing the previous example, if the event coverage fraction is 0.42 for the "bfd-state-change" event type, meaning that 42% of the events observed 5 minutes before failure were of this type, this also means that calling the classifier of MLFF module 302 only when such events are detected reduced the Recall by 58%.

Referring again to FIG. 5, in summary, the primary purpose of TED 502 is to detect the occurrence of certain types of events in the network that are deemed triggering events for a failure. When this happens, TED 502 may provide information 514 to MTE 504, such as an indication of the detected event, telemetry timeseries data, or the like.

In further embodiments, another component of architecture 500 may be rare event trainer 506 which is responsible for training the model(s) 510 of MLFF module 304 such that the model(s) are tuned to accurately detect failures using the triggering event(s) detected by TED 502. In one embodiment, rare event trainer 506 may create the training dataset for model(s) 510 as follows:

The timeseries features (including event features) for all timesteps is created for all entities (e.g., tunnels) for one or many networks. Similarly, the static features are also constructed for all entities for all timesteps. In general, the construction of the features by rare event trainer 506 should use a similar approach as the one used to dynamically create features on MTE 504.

Figure 8B:
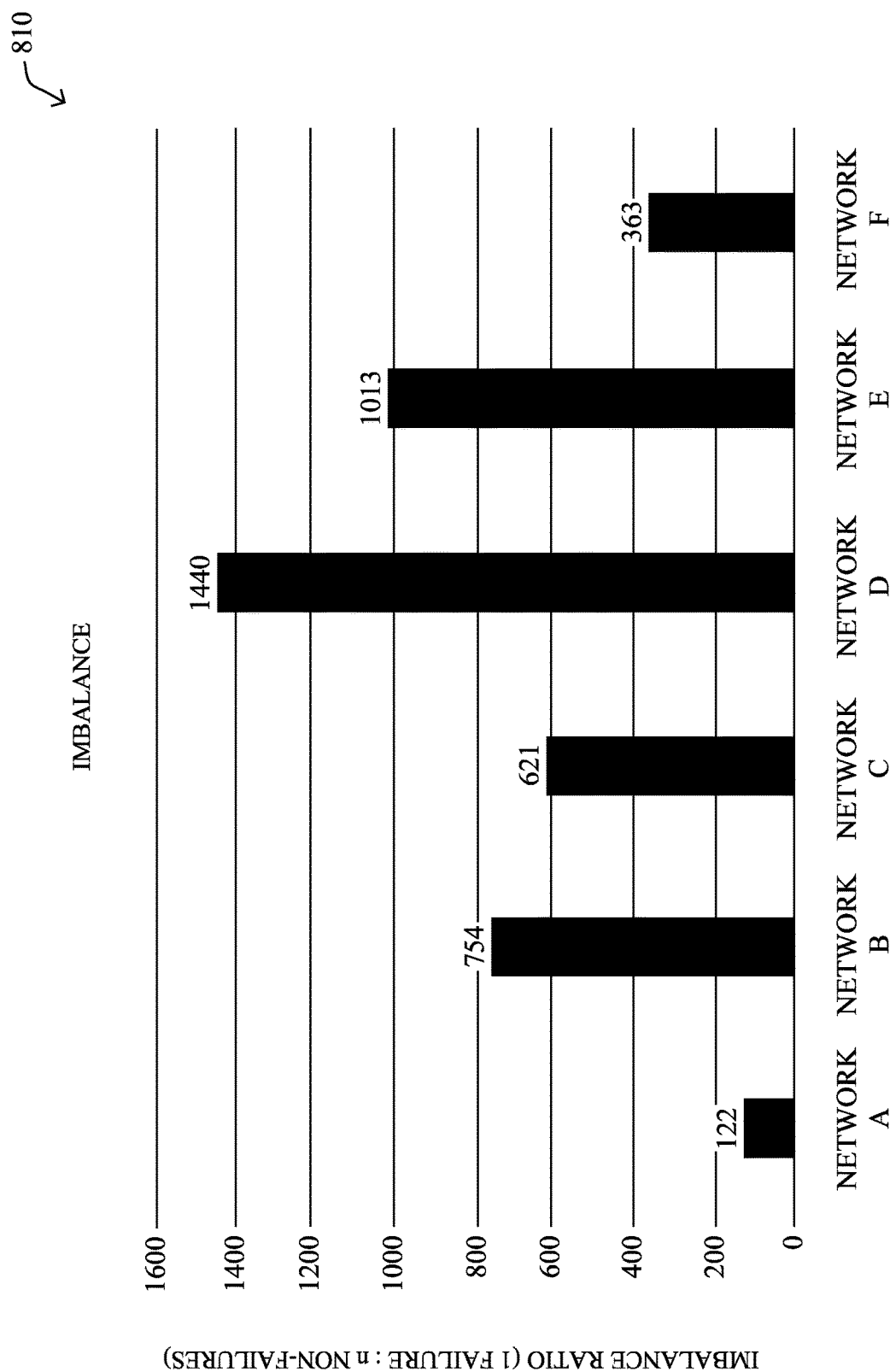

A subset of the entity-timestep combinations are selected by rare event trainer 506 such that trigger events occur in the last "m" timesteps. If none of the trigger events appear in the last-m timesteps, then those rows are removed. Note that such trigger event based selection of subsets, as opposed to other approaches such as up-sampling positives and down-sampling negatives, reduces the number of negatives, considerably. For example, from an imbalance ratio of around 1:5000 to 1:8000, the imbalance ratio reduces from 1:122 to 1:1440 for 6 customers, as shown in plot 810 in FIG. 8B for the same networks of FIG. 8A.

In another embodiment, rare event trainer 506 operates in a fully streaming fashion, creating features only for those entity-timestamp combinations for which a trigger event has occurred in the last "m" steps. Even though the end result is the same (i.e., the obtained dataset is the same), a streaming approach has the benefit of reducing the memory and computational overhead of building and storing features that will end up never being used for training (or inference).

As shown, a further component of architecture 500 may be detection objective analyzer 508 configured to compute the set of event triggers used by TED 502 so as to satisfy a minimum failure detection objective. Indeed, as already pointed out, the impact of false positives can vary significantly. For example, in the case of an SD-WAN tunnel being predicted to fail, at least a portion of the traffic on that tunnel may be proactively rerouted onto another tunnel, which may be less than optimal. In the case of a false positive, this means that the traffic was needlessly routed onto a tunnel that offers a lower quality of service. In other words, a false positive (e.g., a predicted failure that never happens) may lead to a severe degradation of the QoS of the traffic. Accordingly, detection objective analyzer 508 may set a minimum performance objective, such as "maximize recall as long as precision is $>P_{min}$" or the like. To do so, detection objective analyzer 508 may compute the set of event triggers for TED 502 and provide them to TED 502 via event data 512, while taking into account the detection objective. Such an objective may, for example, specify the event coverage fraction of each event, the desired minimum recall and/or precision, while also taking into account the tension between their respective objectives. Indeed, reducing the set of trigger events leads to lower recall, but also increases precision, meaning that a tradeoff must be made.

Figure 9:
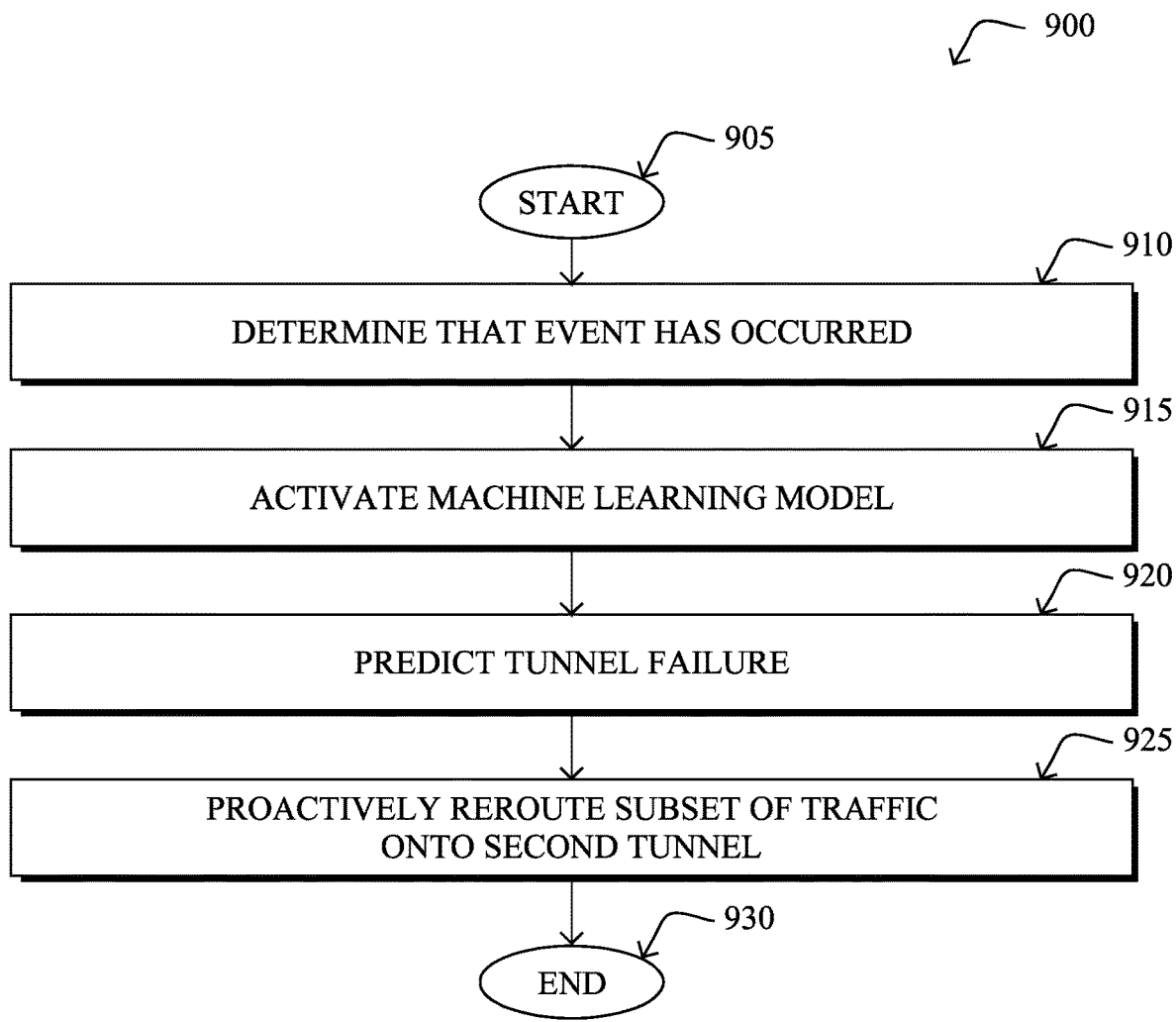
FIG. 9 illustrates an example simplified procedure for the event-triggered prediction of failures in a network.

FIG. 9 illustrates an example simplified procedure for the event triggered prediction of a failure in a network, in accordance with one or more embodiments described herein. For example, a non-generic, specifically configured device (e.g., device 200) may perform procedure 900 by executing stored instructions (e.g., process 248). For example, the device may be an edge router of an SD-WAN or a device that provides a supervisory service for an SD-WAN, to implement predictive routing in the network. As shown, the procedure 900 my start at step 905 and continue on to step 910 where, as described in greater detail above, the service may detect that an event of a particular event type has occurred in the SD-WAN. Such an event may be associated with a configuration change (e.g., a password change, etc.) in the network, a state change in the network (e.g., a system reboot or commit, etc.), or any other desired event type in the network. In some embodiments, the service may receive an indication from a networking device in the SD-WAN that the event has occurred. In further embodiments, the service may receive telemetry data from a networking device in the SD-WAN and determine, based on the telemetry data received from the networking device, that the event occurred.

At step 915, as detailed above, the service may activate, in response to detecting the occurrence of the event, a machine learning model to assess telemetry data regarding a first tunnel in the SD-WAN. In various embodiments, the machine learning model may be specially trained, such as based on a training dataset that includes sets of telemetry data time series in which events of the particular event type occurred. By tailoring the training dataset specifically to examples associated with a trigger event of the particular event type, this greatly reduces the imbalance ratio in the training dataset for the model.

At step 920, the service may predict a failure of the first tunnel, based on the assessment of the telemetry data regarding the first tunnel by the machine learning model, as described in greater detail above. In further embodiments, the prediction may relate to any form of failure or other rare event in the network, such as link flapping, radio failures, route processor failures, or the like.

At step 925, as detailed above, the service may proactively reroute at least a subset of traffic on the first tunnel onto a second tunnel in the SD-WAN, in advance of the predicted failure of the first tunnel. For example, the service may reroute critical traffic from the first tunnel to the second tunnel, to ensure that the traffic is not disrupted when the predicted failure of the first tunnel occurs. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the prediction of rare events in a network, such as tunnel failures in an SD-WAN, based in part on the detection of one or more triggering events in the network. In doing so, the trigger event-based architecture is able to more accurately predict such rare events, thereby reducing false positives and needlessly rerouting traffic onto potentially lower performing tunnels or paths.

While there have been shown and described illustrative embodiments that provide for predictive routing in a network, such as an SD-WAN, it is to be understood that various other adaptations and modifications may be made within the spirit and scope of the embodiments herein. For example, while certain embodiments are described herein with respect to using certain models for purposes of predicting failures or evaluating what-if scenarios, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
identifying, by a service, a trigger event among a plurality of trigger event types based on a probability of a failure occurring in a software-defined wide area network (SD-WAN) within a time period after the trigger event occurring in the SD-WAN;
detecting, by the service, that the trigger event has occurred in the SD-WAN;
activating, by the service and in response to detecting the occurrence of the trigger event, a machine learning model to assess telemetry data regarding a first tunnel in the SD-WAN, wherein the machine learning model is configured to predict failures in the SD-WAN and trained using a training dataset that is created based at least in part on occurrences of the trigger event in the SD-WAN;
predicting, by the service, a failure of the first tunnel, based on the assessment of the telemetry data regarding the first tunnel by the machine learning model; and
proactively rerouting, by the service, at least a subset of traffic on the first tunnel onto a second tunnel in the SD-WAN, in advance of the predicted failure of the first tunnel.

2. The method as in claim 1, wherein detecting that the trigger event has occurred in the SD-WAN comprises:
receiving, at the service, an indication from a networking device in the SD-WAN that the trigger event has occurred.

3. The method as in claim 1, wherein detecting that the trigger event has occurred in the SD-WAN comprises:
receiving, at the service, telemetry data from a networking device in the SD-WAN; and
determining, by the service and based on the telemetry data received from the networking device, that the trigger event occurred.

4. The method as in claim 1, wherein the trigger event is associated with a configuration change made in the SD-WAN.

5. The method as in claim 1, wherein the training dataset comprises sets of telemetry data time series in which the trigger event has occurred.

6. The method as in claim 1, wherein predicting the failure of the first tunnel comprises:
computing an event coverage fraction for the trigger event that indicates how often the trigger event was observed among events leading up to tunnel failures.

7. The method as in claim 1, wherein predicting the failure of the first tunnel comprises:
computing a total coverage fraction that indicates how often a set of event types to which the trigger event belongs were observed among events leading up to tunnel failures.

8. The method as in claim 1, wherein the service activates the machine learning model in response to trigger events of a predefined combination of the plurality of event types being observed in the SD-WAN.

9. The method as in claim 1, further comprising:
computing, by the service, a precision or recall associated with the predicted failure of the tunnel, wherein the service proactively reroutes the subset of traffic on the first tunnel onto the second tunnel in the SD-WAN, based in part on the computed precision or recall.

10. An apparatus, comprising:
one or more network interfaces to communicate with a software-defined wide area network (SD-WAN);
a processor coupled to the network interfaces and configured to execute one or more processes; and
a memory configured to store a process executable by the processor, the process when executed configured to:
identify a trigger event among a plurality of trigger event types based on a probability of a failure occurring in the SD-WAN within a time period after the trigger event occurring in the SD-WAN;
detect that the trigger event has occurred in the SD-WAN;
activate, in response to detecting the occurrence of the trigger event, a machine learning model to assess telemetry data regarding a first tunnel in the SD-WAN, wherein the machine learning model is configured to predict failures in the SD-WAN and trained using a training dataset that is created based at least in part on occurrences of the trigger event in the SD-WAN;

predict a failure of the first tunnel, based on the assessment of the telemetry data regarding the first tunnel by the machine learning model; and proactively reroute at least a subset of traffic on the first tunnel onto a second tunnel in the SD-WAN, in advance of the predicted failure of the first tunnel.

11. The apparatus as in claim 10, wherein the apparatus detects that the trigger event has occurred in the SD-WAN by:

receiving an indication from a networking device in the SD-WAN that the trigger event has occurred.

12. The apparatus as in claim 10, wherein the apparatus detects that the trigger event has occurred in the SD-WAN by:

receiving telemetry data from a networking device in the SD-WAN; and determining, based on the telemetry data received from the networking device, that the trigger event occurred.

13. The apparatus as in claim 10, wherein the trigger event is associated with a configuration change made in the SD-WAN.

14. The apparatus as in claim 10, wherein the training dataset comprises sets of telemetry data time series in which the trigger event has occurred.

15. The apparatus as in claim 10, wherein the apparatus predicts the failure of the first tunnel by:

computing an event coverage fraction for the trigger event that indicates how often the trigger event was observed among events leading up to tunnel failures.

16. The apparatus as in claim 10, wherein the apparatus predicts the failure of the first tunnel by:

computing a total coverage fraction that indicates how often a set of event types to which the trigger event belongs were observed among events leading up to tunnel failures.

17. The apparatus as in claim 10, wherein the apparatus activates the machine learning model in response to trigger events of a predefined combination of the plurality of event types being observed in the SD-WAN.

18. The apparatus as in claim 10, wherein the process when executed is further configured to:

compute a precision or recall associated with the predicted failure of the tunnel, wherein the apparatus proactively reroutes the subset of traffic on the first tunnel onto the second tunnel in the SD-WAN, based in part on the computed precision or recall.

19. A tangible, non-transitory, computer-readable medium storing program instructions that cause a service in a software-defined wide area network (SD-WAN) to execute a process comprising:

identifying, by the service, a trigger event among a plurality of trigger event types based on a probability of a failure occurring in the SD-WAN within a time period after the trigger event occurring in the SD-WAN;

detecting, by the service, that the trigger event has occurred in the SD-WAN;

activating, by the service and in response to detecting the occurrence of the trigger event, a machine learning model to assess telemetry data regarding a first tunnel in the SD-WAN, wherein the machine learning model is configured to predict failures in the SD-WAN and trained using a training dataset that is created based at least in part on occurrences of the trigger event in the SD-WAN;

predicting, by the service, a failure of the first tunnel, based on the assessment of the telemetry data regarding the first tunnel by the machine learning model; and proactively rerouting, by the service, at least a subset of traffic on the first tunnel onto a second tunnel in the SD-WAN, in advance of the predicted failure of the first tunnel.

20. The computer-readable medium as in claim 19, wherein the training dataset comprises sets of telemetry data time series in which the trigger event has occurred.

* * * * *

UNITED STATES PATENT AND TRADEMARK OFFICE
CERTIFICATE OF CORRECTION

| | |
|---|---|
| PATENT NO. | : 11,240,122 B2 |
| APPLICATION NO. | : 16/694520 |
| DATED | : February 1, 2022 |
| INVENTOR(S) | : Vinay Kumar Kolar et al. |

It is certified that error appears in the above-identified patent and that said Letters Patent is hereby corrected as shown below:

In the Specification

Column 7, Line 62, please amend as shown:
others will not be non-predictable ( e.g. , fiber cut , router Column 9, Line 37, please amend as shown:
performance metric that MLFF module 304 may consider is Column 11, Line 48, please amend as shown:
improvement for Max_Recall or Max_Precision , model Signed and Sealed this
Eleventh Day of June, 2024

Katherine Kelly Vidal
*Director of the United States Patent and Trademark Office*